United States Patent [19]

Levine

[11] 4,162,610
[45] Jul. 31, 1979

[54] ELECTRONIC CALENDAR AND DIARY

[76] Inventor: Alfred B. Levine, 2924 Terrace Dr., Chevy Chase, Md. 20015

[21] Appl. No.: 645,645

[22] Filed: Dec. 31, 1975

[51] Int. Cl.² .................................................. G04B 47/00
[52] U.S. Cl. ........................................ 58/148; 58/152 R; 58/4 A
[58] Field of Search ............ 58/4 A, 38, 39.5, 24–26, 58/148–152 R, 24 A, 38 R; 235/145 R; 445/1; 364/200 MS File, 900 MS File

[56] References Cited

U.S. PATENT DOCUMENTS

| | | | |
|---|---|---|---|
| 3,244,369 | 4/1966 | Nassimbene | 235/145 |
| 3,353,347 | 11/1967 | Gates et al. | 58/4 R |
| 3,353,347 | 11/1967 | Gates et al. | 58/148 |
| 3,681,914 | 8/1972 | Loewengart | 58/24 R |
| 3,766,728 | 10/1973 | Nagy | 58/38 |
| 3,803,834 | 4/1974 | Reese | 58/152 R |
| 3,813,533 | 5/1974 | Cone et al. | 58/152 R |
| 3,834,153 | 9/1974 | Yoda | 58/38 R |
| 3,962,858 | 6/1976 | Levine et al. | 58/4 A |
| 3,999,050 | 12/1976 | Pitroda | 340/172.5 X |
| 4,035,627 | 7/1977 | Dickinson | 58/152 R X |

OTHER PUBLICATIONS

IBM Technical Disclosure Bulletin, vol. 15, No. 11, Apr. 1973, "Wrist Worn Terminal" by C. P. Ludeman and D. H. Straif.

*Primary Examiner*—J. V. Truhe
*Assistant Examiner*—Forester W. Isen

[57] ABSTRACT

An electronic schedule calendar and diary for storing in an electronic memory a plurality of future calendar appointments and events for each of a plurality of daily, weekly, or other date interval periods, and enabling the selective retrieval and electronic display of said plural appointments and events for any selected time period. The electronic diary employs manually or remotely controlled entry of said future appointments and events in digital form; manually or remotely controlled correction and updating of said data; and manually controlled retrieval or readout into a visual electronic display. A time-of-day electronic clock may also be included together with an automatic alarm for providing an alarm for each selected appointment or event entered into the memory. In a systems version, a plurality of electronic diaries are employed with a central memory or monitor. Each diary is selectively placed in communication with the central memory for transfer of data therebetween.

13 Claims, 4 Drawing Figures

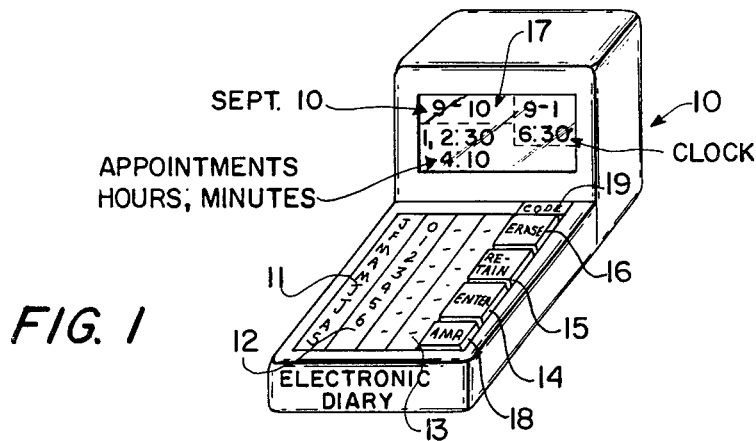
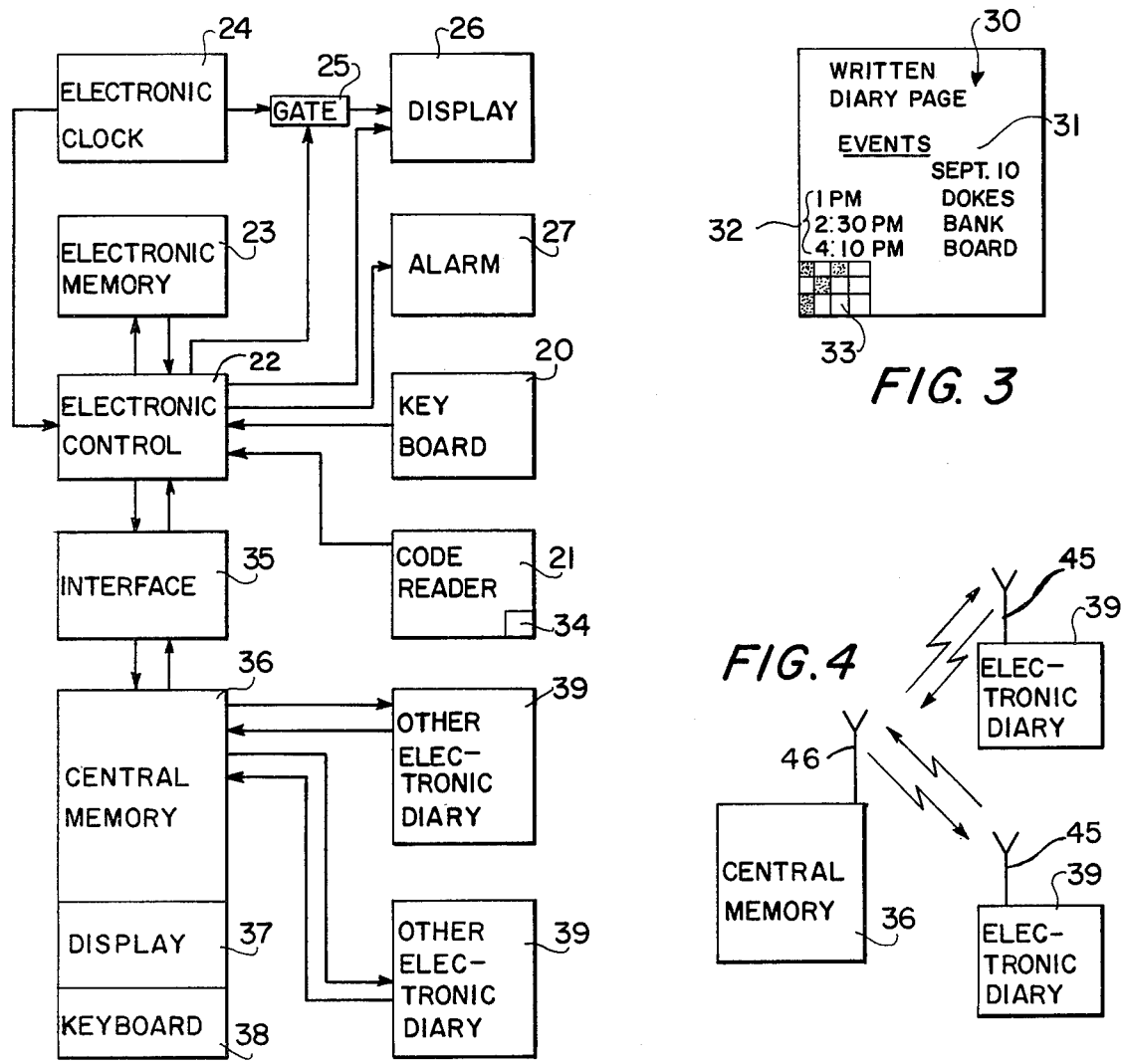

ELECTRONIC CALENDAR AND DIARY

BACKGROUND

It is often necessary for business persons, doctors, dentists, service persons and others to maintain a personal appointments or schedule calendar on a daily or weekly basis in order to properly respond to a schedule of such appointments and events. In some instances, such time scheduling is performed by a secretary, dispatcher or other assistant; but most frequently, the person employs a hand written diary or calendar or schedule listing by dates of the various times of the appointments and events for future days or weeks. Periodic reference to such diary for each succeeding day reveals the appointments for that day. However, should the user neglect to consult his written diary, an important event or appointment may be overlooked and forgotten.

Similarly in many businesses there is a need for scheduling the time of crews or teams of persons to properly service the needs of customer. These schedules are often handwritten, and are updated or corrected by radio or telephone instructions.

BRIEF SUMMARY OF THE INVENTION

According to the present invention, these diary or scheduling functions are performed electronically by supplying the users with an electronic memory and display. In addition, there may be provided an automatic reminder or alarm for each such appointment or event, or for selected appointments or events, whereby at each of the selected future appointment times, an audible and/or visual signal is produced to remind the user of this appointment or event.

Briefly, each electronic diary unit includes an electronic memory, a digital keyboard or other electrical entry, and an electronic display. For each future day, week, or other time interval, there is entered into the memory all of the plural appointments or events by date and time-of-day, and also entered is a code number designating the code of the person or occasion associated with that appointment or event. This stored digital data in the electronic memory may be selectively updated, retrieved and displayed at the convenience of the user. Thus, for any date or interval, the user may interrogate his electronic diary and determine the plurality of scheduled appointments for that day or week, or selectively, those for any future day or week, as is needed. Accordingly, the user may conveniently determine his availability for a future appointment time and may change or update his appointment or event calendar as required.

To provide an automatic reminder of such future appointments and events, or selected ones, this diary also preferably includes an electronic clock together with comparison circuitry for coupling the electronic memory and electronic clock to an alarm, thereby to provide an automatic alarm at the time of each, or selected ones, of the future appointments or events to remind the user of the appointment or event.

For system use by service businesses and others, a plurality of such electronic diaries are provided together with a centralized monitor and memory. Each of the diaries are in communication with the central monitor for the transfer of information and data therebetween.

BRIEF DESCRIPTION OF THE INVENTION

FIG. 1 is a perspective view, diagramatically illustrating the display panel and keyboard of a preferred embodiment, FIG. 2 is an electronic block diagram showing the electrical circuitry in a systems embodiment employing entry by both keyboard and code reader, and FIG. 3 is a simplified illustration of a diary page for receiving both written and coded entry of future appointment data.

FIG. 4 is a schematic diagram illustrating radio communication between a plurality of electronic diaries and a central monitor and memory.

DETAILED DESCRIPTION OF PREFERRED EMBODIMENTS

Referring to FIG. 1, there is shown an electronic calendar diary 10 according to the invention comprised of a housing having a manually operated keyboard with a series of rows of keys 11 to 13, for calendar entries of appointments in the future by month, day, and times-of-day, respectively; and an electronic display panel or screen 17 for selectively displaying the future days and the various times of future appointments and events for those future days. The first row of twelve keys 11 enables the user to enter or display the future month; the next row of thirty-one keys 12 enables the entry or display of the particular day of that future month; and the plurality of additional rows of keys 13 enables the entry or display of a plurality of different future times-of-the day corresponding to scheduled events or appointments for that future day.

At the right of the keyboard, is provided additional keys for selection of the function desired, including a key 14 for enabling "ENTRY" or "UPDATE" of data; a key 15 for "RETRIEVAL" and "DISPLAY", and a key 16 for "ERASE". Still a further control key 19 is provided, labeled "CODE", for the purpose of enabling the user to enter into the memory an additional code after each time of appointment, for designating the person or place or other matter associated with that appointment. As will be described more fully hereafter, a written directory may be adopted by the user to assign an arbitrary code of two or more different digits to each of his different customers, patients, places, or other. This enables the user to record an identification of the event or persons associated with each appointment or event, for later display. An additional key 18 enables the entry of a morning or evening designation, "AM or PM", into the memory for each time of appointment or event being entered.

The electronic panel or screen display 17 in FIG. 1 may conveniently be provided as a bank of light emitting diodes (LED's), as is well known, to provide a number display of the entries retrieved from the memory of the unit. As illustrated, the upper left of the display panel shows the numbers for the future month and day being interrogated, eg. Sept. 10 or "9-10"; and below that date is displayed the times-of-day of the different future appointments or events that are scheduled for that particular day, eg. "1:00 PM, 2:30 PM, and 4:10 PM", as is shown. At the upper right of the display panel 17, there is provided a continual digital clock readout of the present month and day, eg. Sept. 1 or "9-1", and of the present time-of-day, "6:30 PM".

In operation, the user initially enters into the memory of the device his appointment schedule for each future day desired, by initially depressing the "enter" key 14 and then the appropriate "month" key 11 and "day" key 12. Thereafter, he enters each of the proposed appointments or events for that selected day by depressing the appropriate ones of the "time-of-day" keys 13 followed by the "AM or PM" keys 18, and finally followed further by the "code" key 16. After depressing the "code" key 16, he again depresses the same bank of "time" keys 13, but in this instance for the purpose of adding a "code" number that designates the purpose, person, place, or other data concerning that particular future appointment or event.

After all of the future appointments have been entered, they may be corrected, updated, or erased for any day, at any time, by again selecting that particular month and day, and operating the "erase" key 16 to erase; or the "enter" key 14 to correct previous entries, or to add new appointment times-of-day.

Referring to FIG. 2, a preferred system includes both a digital keyboard 20, a digital code reader 21, and a digital electronic memory 23 for receiving and retaining all of the entered digital data pertaining to the future appointments and events for each day period. In conventional fashion, the keyboard 20 and memory 23 are coupled by suitable electronic control circuitry 22 for enabling the keyboard 20 and/or reader 21 to selectively enter, update, or erase digital data in the memory 23, as well as to interrogate the memory 23 for reading out any of the selected data to the visual digital display circuit 26, as described above.

For providing the continual visual display of the present date and time-of-day, there is provided an electronic clock chip 24 that is coupled to the visual display panel 26 through a gate 25. Gate 25 is activated on a recurring time basis by electronic control circuit 22.

For automatically providing an "alarm" upon the occurence of each of the scheduled future appointments and events, the changing digital output of the electronic clock 24 is continually compared to the digital codes stored in the memory 23 and corresponding to the future appointment and events that have been "entered" into the memory 23. Whenever a "coincidence" occurs between the present or clock time and any one of appointment times, a digital comparator circuit (not shown) in the electronic control circuit 22 detects the coincidence of the two digital numbers and actuates the alarm 27 to either visually or audibly, or both, provide an alarm to alert the user of the preveiously scheduled appointment or event.

As thus far described, the preferred device includes both functions of an electronic calendar diary for the selective entry and selective display of scheduled appointments in the future; and also the function of an automatically operating clock and alarm that automatically signals the user whenever anyone of the scheduled appointments and events should occur. In the use of the electronic calendar, the user may at anytime enter, erase, or update his appointment schedule for any day in the future. He may also correspondingly read out and visually display his schedule of appointments and events for any particular day or days. In connection with each such future appointment or event, he may also store in the memory an identifying code that will inform him of the person, place or occasion involved with that particular appointment.

Should additional data or information be required to be recorded in connection with any of such appointments, it is, of course, possible to provide a more extensive memory 23, keyboard 20, and display 26 to accomodate the storage and readout of a good deal more information regarding such appointment or event. However, in the interest of providing a less expensive and less complex unit that may be manufactured in small size and be battery operated for the pocket or purse, it is preferred to limit the capacity of the keyboard 20, memory 23, and display 26 to the storage and entry of only the above mentioned brief digital data for each appointment or event, and to also limit the capacity of the calendar diary to the storage of such data for only a finite number of days of about two months or less. In the event that additional information is required to be remembered or stored for any appointment or event, the user may employ a written diary, as generally shown in FIG. 3, to supplement the capacity of the electronic diary.

Referring to FIG. 3, the pages 30 of the written diary may contain the date 31, by month and day, followed by a listing or tabulation 32 of only those scheduled appointments or events that may require more information than can be conveniently stored in the abbreviated memory 23 of the electronic unit. In this manner the written or printed diary may be used as a supplement to the electronic unit. To minimize the need for consulting the written diary 30 in connection with scheduled appointments and events of a routine nature, those important events that require added reference to the written diary page may be suitably tagged or identified in the electronic memory 23 by entering and storing a giving code number, such as "9", following the appointment. Consequently, during readout of the appointments or events for any given day, the written diary pages need not be consulted by the user unless one of the scheduled appointments or events as displayed is followed by the code number "9".

In the event it is desired to employ a code reader 21 instead of, or to supplement, the keyboard 20, the pages 30 of the written diary may be imprinted with a code field 33 at one corner, as shown in FIG. 3, with the different spaces in the field representing different times-of-day for the appointments. The user may appropriately mark in the proper spaces by pencil or pen corresponding to the appointments or events to be scheduled, or may punch holes in such spaces. Insertion of such a coded record 33 in a slot 34 of the code reader 21 enables the scheduled appointments to be read and entered into the electronic memory 23 in the same manner as entry using the manual keyboard 20.

It is often desired to provide centralized monitoring of the future appointment schedules of a series of different persons so that the location of such persons on given days or times can be quickly determined where necessary from a centralized location. For example, where such electronic diaries are being used by a group of salespersons to schedule conferences with prospective customers; or by a team of plumbers, or other service persons, to schedule service appointments with customers at different locations. In these and many other instances, it is often desirable for a central office to be able to determine the location of, or select that one of such persons having unscheduled time on a particular day and time of day to perform service for a customer. According to the present invention this is performed by periodically interconnecting a plurality of such diaries to a centralized memory 36 for transmitting the schedules of appointment data in the memory 23 of each different diary unit to the centralized memory unit 41 of a large scale memory or computer 36. To perform such monitoring, the centralized memory 36 is provided with suitable transmit interfaces 35 having included interrogate means, whereby the memory 23 of each electronic diaries is interrogated, in time sequence, to read out the stored data to the central memory 36. Such monitoring is preferably performed on a regularly scheduled repeated basis to correct and update the time schedule for each (diary) person. As will be appreciated by those skilled in the art, each interface 35 additionally transmits an identifying code to the central computer 41 to identify that particular diary user and distinguish him from the others. At the central monitoring station, the stored data may be selectively displayed at 37 for any diary or in combination employed in many different ways depending upon the needs of the system user. As indicated above, this central monitor and display may be used to select any one or more persons having available or unassigned free time on a particular date and time. It may also be used in a cumulative many to determine efficiency; that is, to determine when the individual salespersons are overscheduled or underscheduled. Other uses will also be appreciated by those skilled in this art.

Those skilled in the electronic arts will appreciate that integrated circuit chips to provide the functions described are presently available on the open market, including integrated circuit chips for the memory 23, electronic clock 24, digital comparator and control circuit 22, as well as for the other functions described. Solid state visual display panels 17 and 26 are also presently available for the display using light emitting diodes, liquid crystal displays or others. It is preferred that the individual electronic calendar diaries be constructed in miniaturized pocket size form adapted to be battery powered and portable to be carried in the pocket or purse in the same manner as a written pocket diary. In such instance, to provide centralized monitoring of the memories of the individual units, the monitoring system may employ plug-in receptacles at the office or other fixed location to receive each unit and couple to the memory 23 through the interface 35. In this manner, each user, such as a salesperson, may periodically insert his diary unit into an office plug-in receptacle to transmit the stored data in his memory unit 36 to that of the central unit 36, and may then remove the unit to be carried by him on his scheduled round of appointments for that particular day. Alternatively, or in addition to this system mode-of-operation, the central memory 36 may also transmit future appointment data to the individual electronic memory units of the users. In this manner, appointments for future events may be scheduled by the central office for any of the individual diary users, along with a coded designation of the person, place, or purpose for that future appointment. Should the user require additional information regarding any such future appointment scheduled by the Central Office, he may communicate back to the Central office by telephone or radio to obtain such additional information.

Considering, for example in FIG. 2, a system of this kind used by a plumbing business having a central office, together with a crew of plumbers that travel to homes and offices on a prescheduled basis to provide plumbing services. Requests for such services are initiated by the customers by telephone to the Central Office where the nature of the service needed is discussed with the customer and a scheduled appointment for visit by a plumber is made. At the central office, a read out from display 37 from the central memory 36 reveals the entire time schedules of all the crew of plumbers, whereby the Central Office can immediately assign a plumber having unassigned available time for that particular appointment. This assignment of an appointment for a particular plumber at a particular time is made at the Central Office by entry into the Central processor and memory 36. Upon the next return of that plumber to the office, or upon his call-in for a future assignment, this appointment is conveyed to him by telephone or by plug-in of his electronic diary 39 to a receptacle coupled to the central memory 36. If the appointment is conveyed to him by phone, the plumber manually enters the date and time of the appointment into his portable unit 39 by operation of the keyboard 20 as discussed above. Alternatively, the appointment date and time is automatically entered into the memory 23 of his diary unit by plugging-in his unit 39 into the fixed receptacle connected by interface with central memory 36.

In today's mobile society, most of the service trucks for plumbers, electricians, taxicabs, and the like, are provided with mobile radio communication equipment with the Central office. In this event, the digital appointment data may be transmitted by radio between the service truck and the Central Office as illustrated in FIG. 4. In this instance, a plug-in receptacle for the diary and a transmit coder may be provided in the mobile truck (not shown) and be coupled to the individual electronic diaries by a radio transmitter-receiver and antenna 45 in the truck. The scheduled appointment data in the electronic diary 39 may thereby be automatically transmitted from the mobile truck to the Central memory 36 having transmitter-receiver antenna 46 for storage; and correspondingly, scheduled data from the central memory 36 may be transmitted by radio and antenna 46 to the truck for recording into the memory 23 of the electronic diary 39.

As will be appreciated by those skilled in this art in the light of the above disclosure, many other applications of the electronic diary and system of such diaries may be made; as well as many changes in the format and mode-of-operation of each diary for different uses. Accordingly, this invention should be considered as being limited only by the following claims:

What is claimed is:

1. An electronic diary, calendar, and clock comprising:
   an electronic clock for cumulatively determining the actual date and time-of-day as a number of functions including minutes, hours, days, and months,
   an electronic visual display for displaying the actual time-of-day, day and month,
   an electronic memory means for storing a plurality of time-of-day appointments for each of a plurality of different days, including present and future days,
   manually controlled means coupled to said memory for selecting, at will, each of the present and future days, individually, and for entering into and storing in said memory for that selected day digital data corresponding to a plurality of different time-of-day appointments,
   said manually controlled means including manually controlled correction and update means for selectively changing and updating, at will, in the memory the digital data for any given appointment time-of-day for any of said given present and future days, thereby to enable the schedule of time appointments in said memory for any given day to be corrected and rendered current at any time, said manually controlled means including manually controlled retrieval means for selectively accessing said electronic memory, at will, for any one of the plurality of different days, and for reading out the stored schedule of time-of-day appointments to said electronic display for concurrently displaying the plural appointment times for that day.

2. In the apparatus of claim 1, said manually controlled entry means comprising a keyboard.

3. In the apparatus of claim 1, said manually controlled entry means comprising a reader for a record bearing the code of said digital data.

4. In the apparatus of claim 1, said memory storing additional digital data identifying one of the persons or purposes of said time of day calendar appointments, and said entry means enabling the entry into said memory of said additional digital data.

5. In the apparatus of claim 1, said entry means enabling the selective visual indication on said display of actual time-of-day.

6. In an electronic diary and scheduling system, a plurality of satellite electronic diaries, each having a digital memory for storage of data of future appointments and events, digital entry means for said memory, and a digital display for reading out of said memory, a central monitor having a digital memory for centralized storing and display of the future appointments and events from said plurality of satellite diaries, reversible means for selectively transferring data between said satellite diaries and central monitor, said central monitor transfering data including said future appointments and events to the satellite diaries, said central monitor including an electronic clock for cumulatively determining the time of day and date and including automatic means for generating reminder alarms of said future appointments and events.

7. An electronic diary of future events and appointments comprising:
   an electronic visual display for digital data,
   an electronic memory for selectively storing digital data concerning plural future time-of-day events and calendar appointments and having capacity for storing a plurality of future events and appointments for each of a plurality of different days in the future,
   manually controlled electrical entry means for enabling the selective entry into said memory, at will, of said plural future time-of-day events and calendar appointments for each day, and enabling the selective correction and updating of said stored digital data, at will,
   and manually controlled electrical retrieval means for coupling said memory to said visual display to concurrently visually indicate the entire schedule of plural appointment times-of-day for any one of the selected present and future days.

8. In the apparatus of claim 7, said manually controlled entry means and manually controlled retrieval means including a keyboard having plural keyboard switches having designations of time-of-day and day.

9. In the apparatus of claim 7, a plurality of said electronic diaries, a central memory, a central retrieval means and a central display; transmission means for coupling said plurality of diaries to the central diary for storing the plurality of future events and calendar appointments for said plurality of diaries in said central memory, said central retrieval means and central display enabling the calendar schedule for any of said plural diaries to be selectively retrieved and displayed for any selected different day.

10. In the apparatus of claim 7, a plurality of said electronic diaries, a central monitor for said plurality of diaries, and means for coupling said diaries to said central monitor for storing the calendar schedule of said diaries in said monitor.

11. In the apparatus of claim 7, a plurality of said electronic diaries, and a central monitor having a memory for communication with said diaries, thereby to provide a central storage of the future appointments from said plurality of diaries.

12. In the apparatus of claim 11, means for reversibly communicating appointment and event data between said diaries and said central monitor.

13. In the apparatus of claim 7, means enabling the entry into said memory of a tag code associated with any one of said future events and calendar appointments.

* * * * *